United States Patent [19]
Lauer et al.

[11] Patent Number: 5,820,892
[45] Date of Patent: Oct. 13, 1998

[54] FOOD EXTRUSION ASSEMBLY

[76] Inventors: James D. Lauer; Margaret T. Lauer, both of 1703 Anderlie Ln. West, White Bear Lake, Minn. 55110-7812

[21] Appl. No.: 718,815

[22] Filed: Sep. 27, 1996

[51] Int. Cl.$^6$ .............................. A23G 9/28; B29C 47/96
[52] U.S. Cl. ................. 425/151; 425/162; 425/376.1; 425/382 R; 425/464; 222/52; 222/63; 222/334; 426/516
[58] Field of Search .................................... 425/151, 161, 425/167, 190, 461, 464, 376.1, 382 R; 222/52, 63, 334; 426/516

[56] References Cited

U.S. PATENT DOCUMENTS

| | | |
|---|---|---|
| 1,607,880 | 11/1926 | Dungan . |
| 1,999,926 | 4/1935 | Garzia . |
| 4,470,788 | 9/1984 | Coggiola ................................. 425/151 |
| 4,669,275 | 6/1987 | Ohgushi et al. ........................... 62/342 |
| 4,861,255 | 8/1989 | Ney ...................................... 425/376.1 |
| 5,020,698 | 6/1991 | Crossley ................................... 222/386 |
| 5,208,050 | 5/1993 | Ney ...................................... 425/376.1 |
| 5,348,585 | 9/1994 | Weston .................................... 222/63 |
| 5,464,120 | 11/1995 | Alpers et al. ............................. 222/63 |

*Primary Examiner*—Khanh P. Nguyen
*Attorney, Agent, or Firm*—Anthony G. Eggink

[57] ABSTRACT

A food extrusion assembly and particularly an ice cream extrusion assembly for providing a stream of elongated strands of ice cream or other foods of a predetermined cross-sectional configuration. The extrusion assembly includes a housing structure having a base portion and an upright support structure. A plunger assembly is mounted to the housing and has an activatable shaft and separable plunger head. A container mounting structure is provided to receive an extrusion container in alignment with the movement of the plunger head. The extrusion container has a predetermined pattern of extrusion apertures through its bottom surface. The extrusion container locks into the container mounting structure to permit the activation of a switch and to thereby cause the plunger head to penetrate the extrusion container for ice cream extrusion processing.

20 Claims, 7 Drawing Sheets

Air Schematic

Fig. 15

Electrical Schematic

FOOD EXTRUSION ASSEMBLY

BACKGROUND OF THE INVENTION

This invention relates generally to a food processing assembly and particularly to an assembly for extruding various food products into streams of elongated strands of a predetermined cross-sectional configuration. Particularly, the present invention relates to an ice cream extrusion assembly for processing ice cream and other food products into various forms, including food forms such as pasta.

Ice cream, for example, is a popular dessert item and is dispensed for consumption in primarily either a hard or a soft state. However, each physical state, whether hard or soft, has inherent benefits with respect to flavor, taste as well as its look and feel. For example, soft ice cream may be served in swirls and hand-held in a cone whereas hard ice cream may be scooped into a bowl, receive various toppings and consumed with a spoon. The ice cream processing assembly of the present invention is constructed and arranged to extrude hard ice cream into a state having a unique look and feel. Specifically, the ice cream processing assembly of the invention extrudes ice cream or like food products into a predetermined form having the look and feel of a variety of pasta forms, for example.

Although various ice cream processing assemblies have been manufactured and proposed in the past, none as far as is known has provided an ice cream extrusion assembly which is efficient and easy in operation, quickly disassembled for cleaning purposes and capable of extruding ice cream or the like into a variety of elongated ribbon or string-like forms having specific cross sectional shapes. It is therefore an object of the present invention to provide an ice cream extrusion assembly which is versatile in use, safe and easy to operate and which is constructed and arranged to be quickly disassembled for cleaning purposes. It is a further object of this invention to provide a food extrusion assembly which may be utilized to extrude ice cream, tofu or other foods into various predetermined elongated forms and particularly into forms which assimilate the look and feel of other and different foods, such as various pastas, including elongated ribbon and string forms and in various flavors and colors to assimilate the look and feel of spaghetti, fettuccini, lasagna, etc.

SUMMARY OF THE INVENTION

The present invention provides food extrusion assembly constructed and arranged to extrude various foods, such as quantities of ice cream, into a stream of elongated strands or ribbons having predetermined cross-sectional configurations. The extrusion assembly has a housing with a base and an upright support structure. A plunger assembly is mounted to the housing and which is comprised of an activatable shaft having a separable plunger head attached thereto. A container mounting structure is mounted to the housing assembly in alignment with the movement of the plunger head. An extrusion container is provided for placement in the container mounting structure. The extrusion container has a predetermined pattern of extrusion apertures through its bottom surface and is adapted to receive a quantity of ice cream. An activation structure comprised of a switch coupled to power means is provided to operate the ice cream extrusion assembly when the extrusion container has been properly positioned in the container mounting structure.

The ice cream extrusion assembly of the invention further provides extrusion containers having a variety of extrusion apertures, each having predetermined cross-sectional configurations to thereby yield the extrusion of elongated ice cream strands, ribbons, or strips to assimilate the look and feel of various pastas, such as spaghetti, fettuccini, etc. Further provided are extrusion containers having opposing pegs extending from the side wall thereof and which cooperated with opposing slots in the container mounting structure to thereby lock the extrusion containers therein and to permit the activation of the ice cream extrusion assembly.

Further provided by the present invention is an ice cream extrusion assembly constructed of stainless steel materials as well as separable parts to permit the extrusion assembly to be dismantled for cleaning purposes in compliance with regulations controlling the use and operation of food related apparatus.

Also provided is an ice cream extrusion assembly utilizing a compressed air source and an activatable pneumatic cylinder for operating the plunger assembly and which provides a safe and repeatable assembly having structural integrity. Further provided is an extrusion assembly which is easily adjustable to accommodate the extrusion of various foods and food consistencies.

These and other benefits of this invention will become clear from the following description by reference to the drawings.

DESCRIPTION OF THE PREFERRED EMBODIMENT

The drawings described above and the description below relate to a food extrusion assembly 10 which provides a stream of elongated strands or ribbons of food having a predetermined cross sectional configuration. Particularly, the drawings and description relate to an ice cream extrusion assembly. The extrusion assembly 10 is generally comprised of a housing 11 which includes a base portion 13 and an upright support structure 55. The food extrusion assembly 10 is operated by electrical, pneumatic and mechanical means whereby an activatable air cylinder pushes a plunger head 30 into an extrusion cup 15 which is adapted to receive a quantity of ice cream and which has a perforated bottom 16. A cylindrical sleeve or cup receiving structure 14 is constructed and arranged to receive and hold the extrusion cup 15 during the operation of the extrusion assembly 10. The cup receiving structure 14 is constructed and arranged to cooperate with a contact switch 45 that is activated when the extrusion cup 15 is properly placed in the receiving structure 14. The operational elements of the extrusion assembly 10 are sealed from the housing 11 and are separable therefrom for cleaning purposes.

Figure 1:
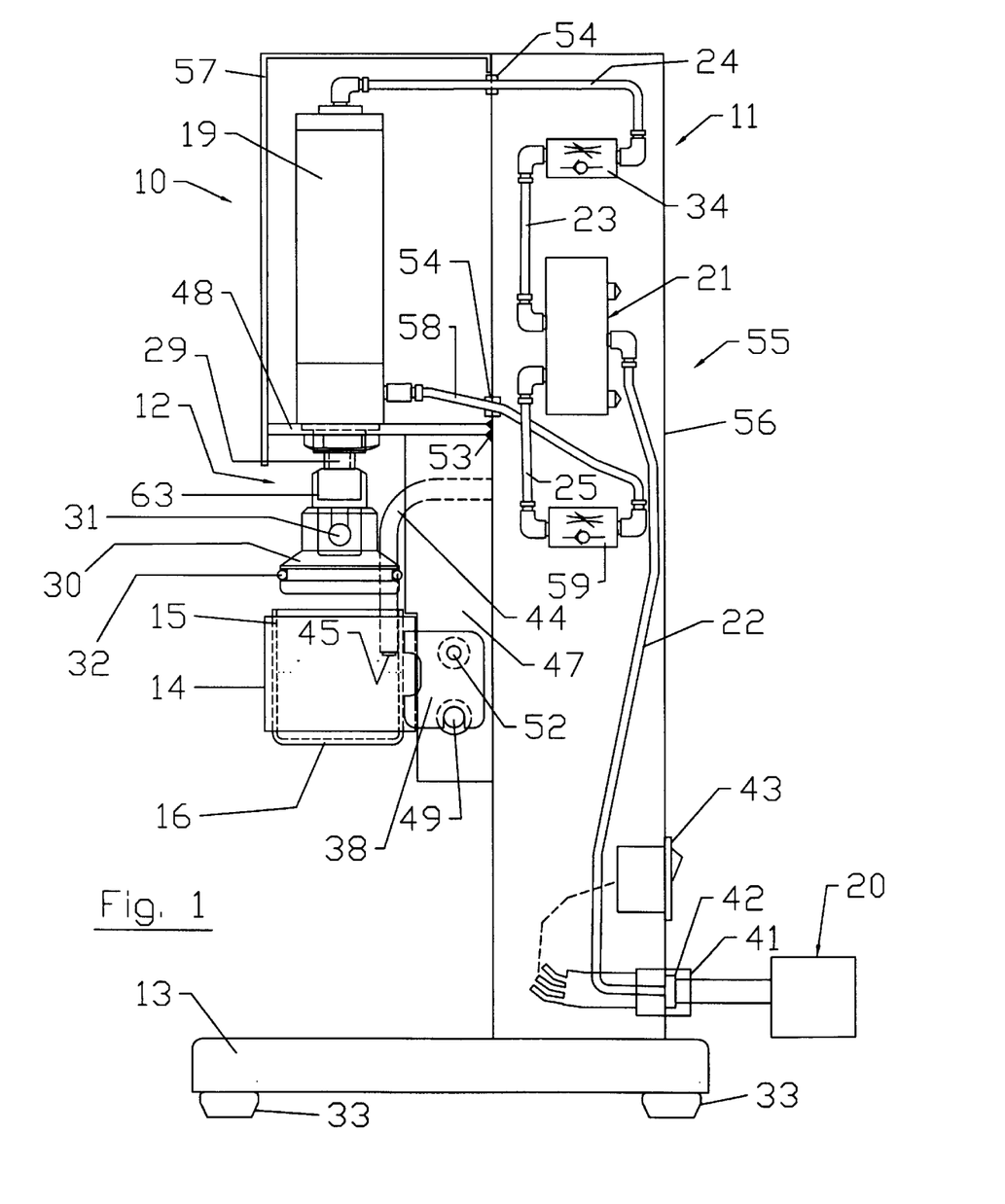
FIG. 1 is a lateral plan view showing the ice cream extrusion assembly of the present invention.
Figure 2:
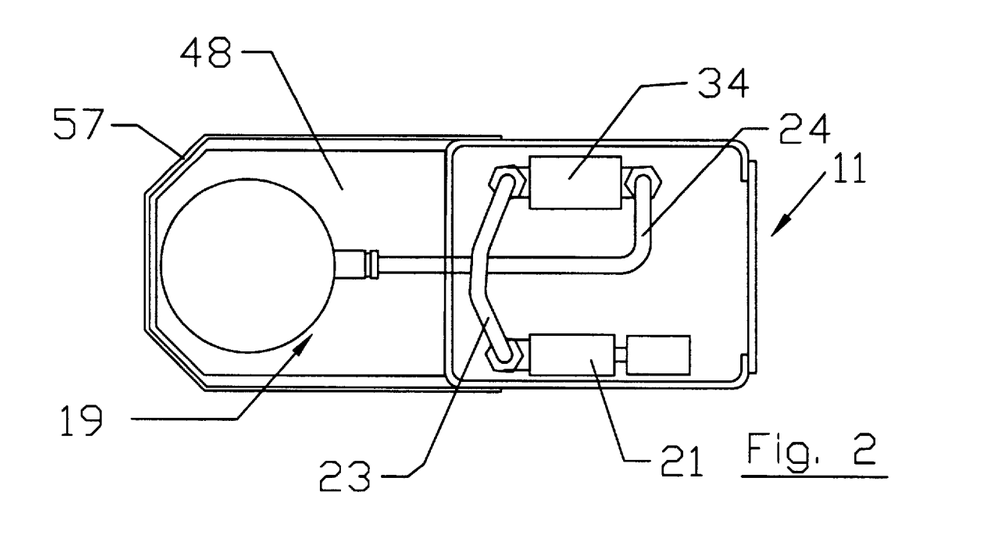
FIG. 2 is a top plan view of the ice cream extrusion assembly.
Figure 3:
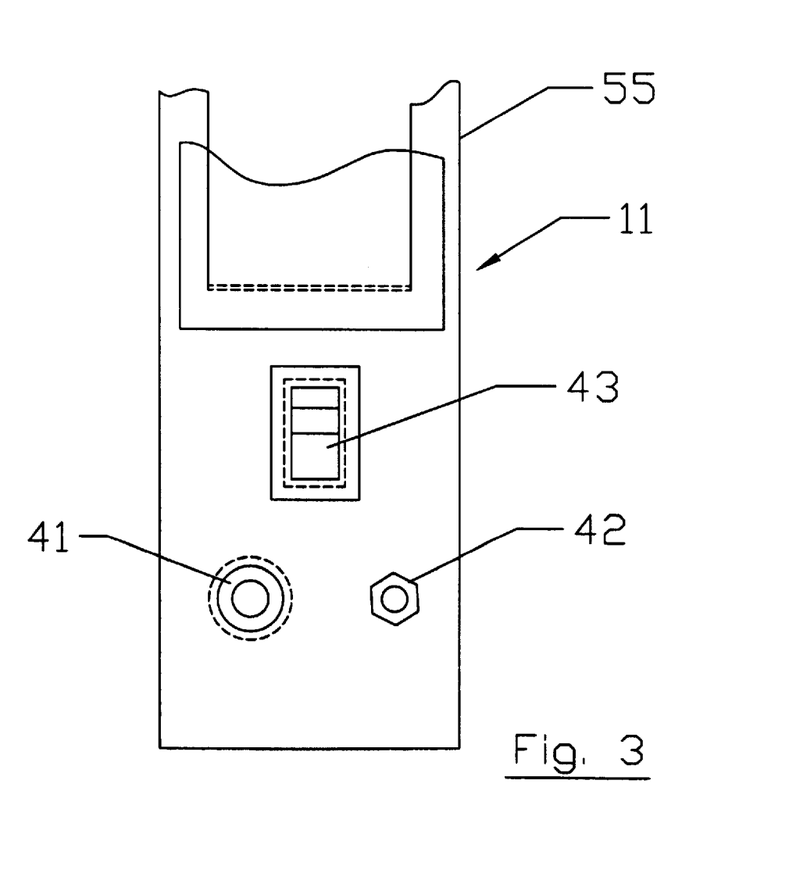
FIG. 3 is a rear plan view of the ice cream extrusion assembly.

Referring to FIGS. 1–3, an ice cream extrusion assembly 10 is shown having a housing assembly 11 which includes a base member 13, an upright member 55 with a removable rear cover or access panel 56 and a top cover member 57 positioned at the front of the assembly. The rear cover or access panel 56 which is fastened to the rear of the upright structure 55 permits easy access to the interior of the structure 55 and wherein the various operational elements of the assembly 10 are located. Attached to the upright member 55 are a horizontally disposed support plate 48 and a vertically disposed support plate 47. The horizontal support plate 48 and the vertical support plate 47 are preferably welded to each other and to the stainless steel plate of the upright structure 55. This configuration provides a structurally sound beam-type configuration to adequately deal with the force exerted by the downward movement of the plunger head 30 into the extrusion cup 15.

Figures 11, 11A:
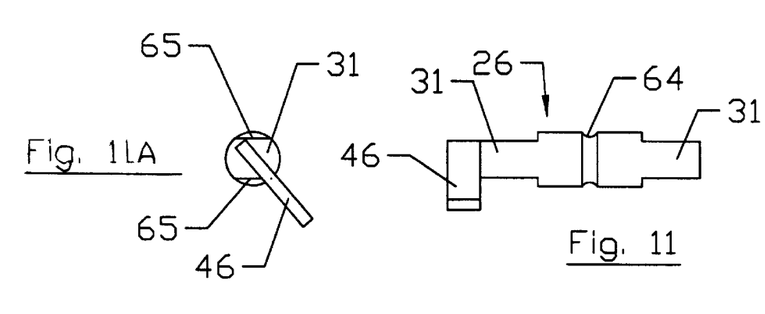
FIG. 11 is a lateral plan view of the locking pin for the plunger head.
FIG. 11A is an end view of the locking pin shown in FIG. 11.

A plunger assembly 12 is shown attached to the support plate 48 and which extends downwardly from the top of the housing assembly 11. The plunger assembly 12 is comprised of an air cylinder 19, a piston shaft 29, a piston extension 63 and a separable plunger head 30. The piston rod extension 63 is shown connected to the piston shaft 29. For example, such connection may be a mating thread arrangement whereby the respective parts may be separated for cleaning purposes. The separable head 30 is shown attached to the piston extension 63 by means of a head locking pin structure 26 having end portions 31. As further shown in FIGS. 11 and 11A, the head locking pin structure 26 has a generally centrally disposed peripheral ridge 64 and opposing end portions 31. Each end portion 31 has opposing flat portions 65 which are utilized to lock the plunger head 30 to the piston extension 63 by means of turning the lever 46. As shown particularly in FIG. 4, a holding member 76 is utilized to secure the head locking pin 26 within the piston rod extension 63. The holding member 76 may be a spring loaded holding structure which extends through an aperture in piston rod extension 63 an which engages the head locking pin 26 at its centrally disposed peripheral ridge 64.

A cup receiving assembly 14 is shown attached to the support plate 47 of the upright member 55 of the housing assembly 11 by means of brackets 37 and 38. As will be further described, the vertically disposed support plate 47 has opposing support shafts or rods 49 attached thereto for receiving the separable cup receiving assembly 14. A sleeve locking pin 52 is utilized through aligned apertures to attach the cup receiving means 14 to the support plate 47. The sleeve locking pin 52 is a removable locking pin structure which is easily locked into place to secure the cylindrical sleeve 14 to the support plate structure 47. For example, the sleeve locking pin 52 may be a pressure pin which when activated permits the placement or removal of the pin from the aligned apertures and which otherwise has a protruding lateral bearing member which locks the pin in place to thereby secure the cylindrical sleeve 14 to its mounting structure.

The cup receiving assembly 14 is shown to be a cylindrical sleeve mounted in alignment with the downward movement of the plunger head 30 of the plunger assembly 12. The cylindrical sleeve 14 is separable from the housing assembly 11 for cleaning purposes. The housing assembly 11 is shown to enclose a plurality of elements which communicate with the plunger assembly 12 and the cup receiving assembly 14. An electrical source 41 and a compressed air source 20 are shown connected to the housing assembly 11 to operate and control the various elements therein as will be further discussed.

The housing structure 11 has a stainless steel structure whereby the base 13 the upright structure 55 are welded into a unitary structure. Support pads 33 are attached to the bottom of the base 13. The horizontally disposed support plate 48 and the vertically disposed support plate 47 are of a stainless steel composition and are shown welded to each other and to the upright structure 55. The compressed airlines, i.e. 24 and 58 as well as the conduit 44, are all sealed with respect to the upright structure 55. The top cover 57 shown attached to upright member 55, access panel 56 and support plate 48 are likewise constructed of stainless steel and is removable to provide access to the air cylinder 19. The control valves 34 and 59 which respectively control the up and down movement of the air cylinder's plunger assembly 12 are accessible from the outside of the upright structure 55. Thus, depending upon the consistency or hardness of the food to be extruded, the operator may turn respective adjustment knobs on the exterior of the assembly to control the airflow in the valves 34 and 59 and to, thereby, control the rate of movement of the plunger assembly 12.

Figures 12, 13B:
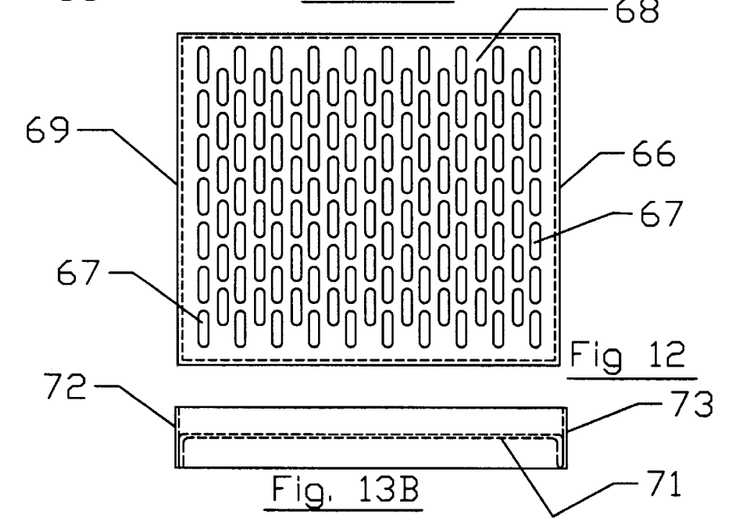
FIG. 12 is a top plan view showing the drip pan of the ice cream extrusion assembly.
FIGS. 13A and 13B are lateral plan views, respectively, of the drip pan holder of FIG. 13.
Figure 12A:
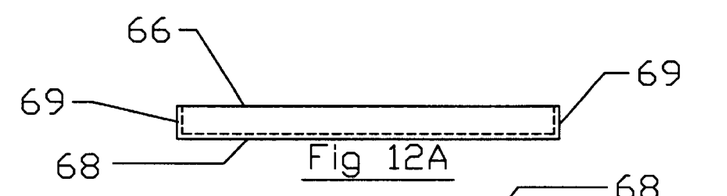
FIG. 12A is a lateral plan view of the drip pan of FIG. 12.
Figures 13, 13A:
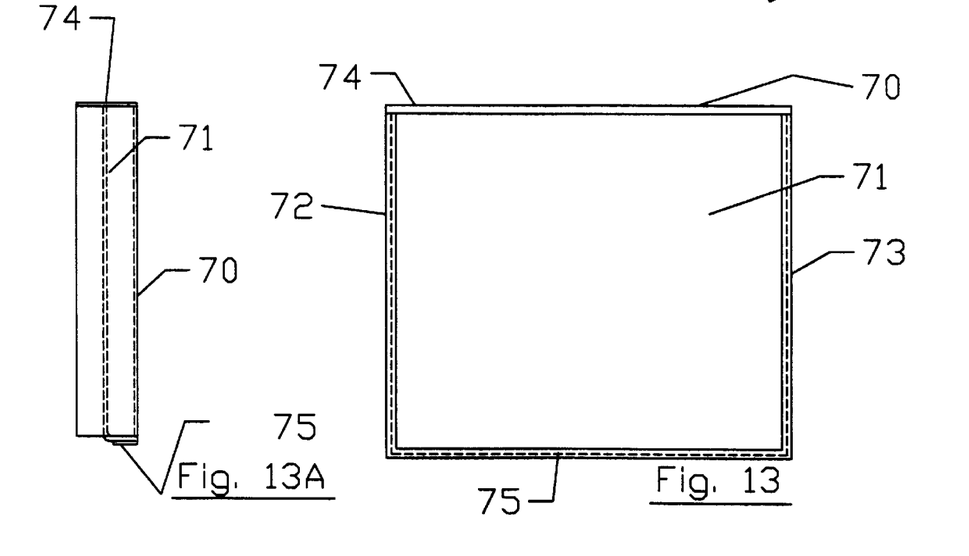
FIG. 13 is a top plan view showing the drip pan holder.

As shown in the drawings, the perforated bottom 16 of the extrusion cup 15 is positioned spatially above the base 13 of the extrusion assembly 10. A serving dish or container may be placed on the base 13 surface directly underneath the perforated bottom 16 so that the stream of elongated strands of ice cream is directed into the serving dish. Preferably however, as shown in FIGS. 12 and 13, a drip pan 66 and drip pan holder assembly 70 may be placed onto the base 13 and whereby the serving dish is placed onto the drip pan 66. The drip pan 66 has a top surface 68 with a plurality of apertures 67 designed to permit any ice cream to drip into the holder 70. The drip pan 66 is shown to have sides 69 which result in the top surface 68 being disposed upwardly from the support surface 71 of the drip pan holder 70. The drip pan holder 70 has side portions 72, 73 and 74 which form a three sided peripheral base. As shown, side edge 75 has a height which only corresponds to the depth of the holder 70. This configuration permits the drip pan holder 70 to cover the base 13 of the assembly housing 11 whereby the side edge 75 abuts the base of the upright structure 55. Thus, the drip pan 68 and holder assembly 70 provide a means to catch and hold any ice cream which falls outside the serving container. Preferably, the drip pan 66 and holder assembly 70 are constructed of stainless steel, are separable and, thus, easily emptied and cleaned.

Figure 4:
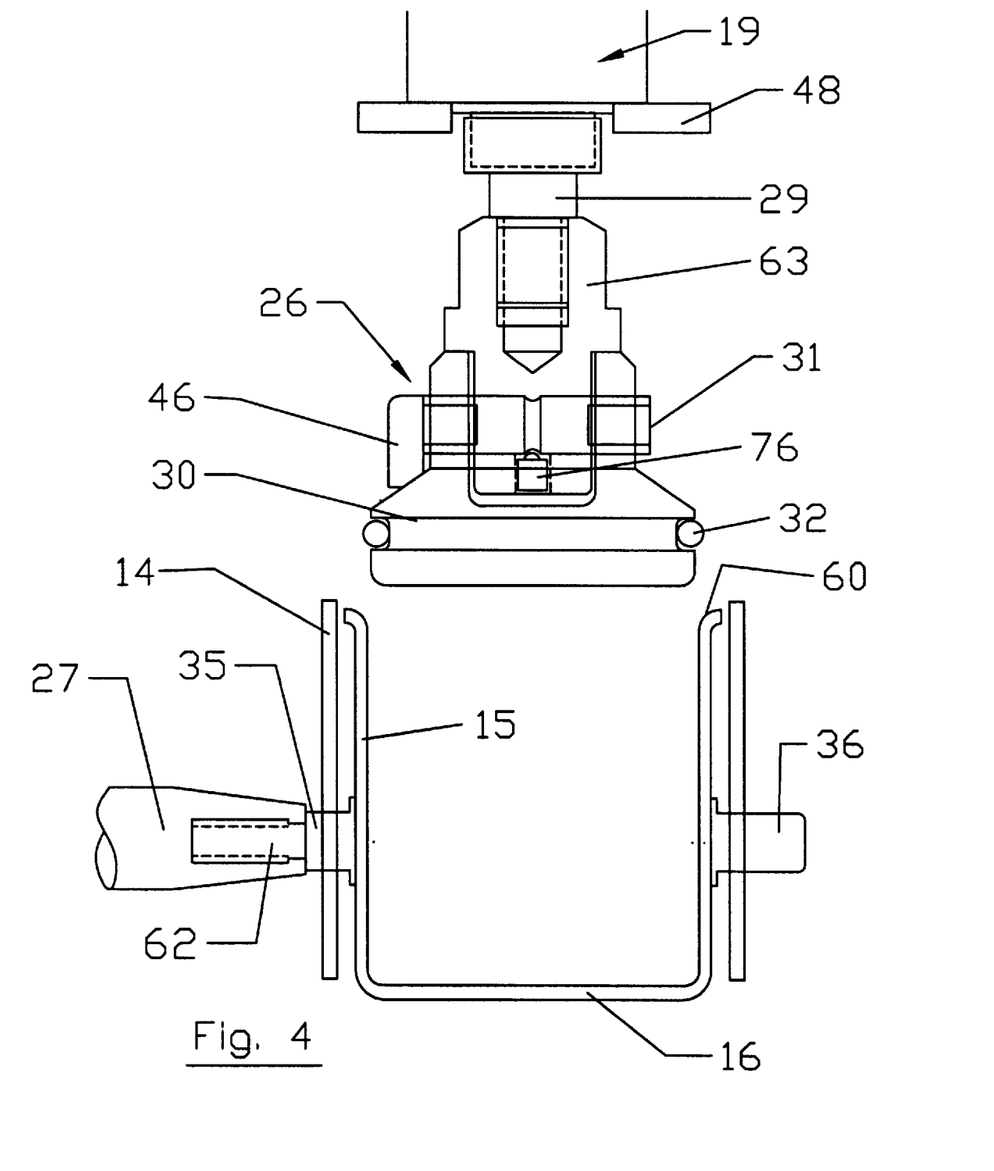
FIG. 4 is a front plan view, partially in section, showing the cup, the cup receiving structure and plunger assembly head of the ice cream extrusion assembly.
Figure 5:
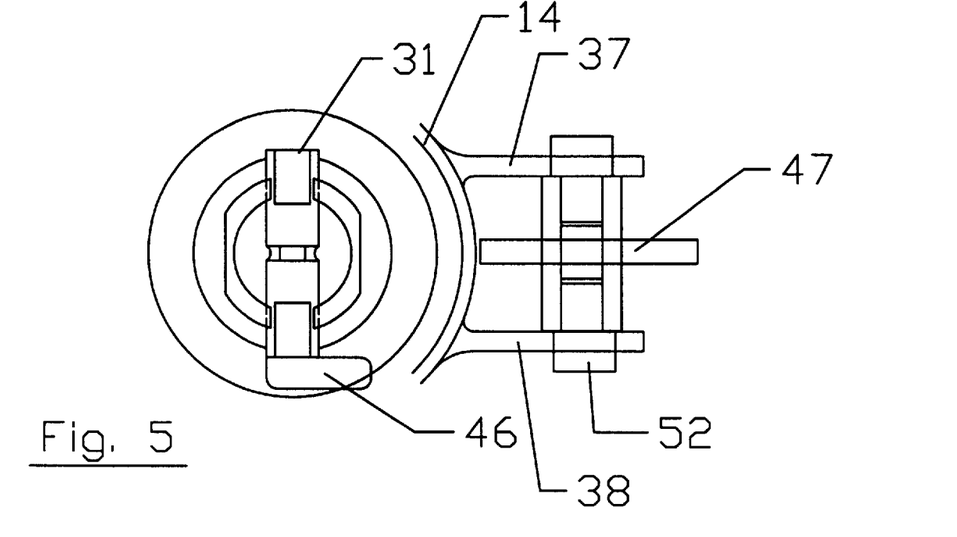
FIG. 5 is a top sectional view of the locking structure of the plunger assembly and the locking structure of the separable cup receiving structure.
Figure 6:
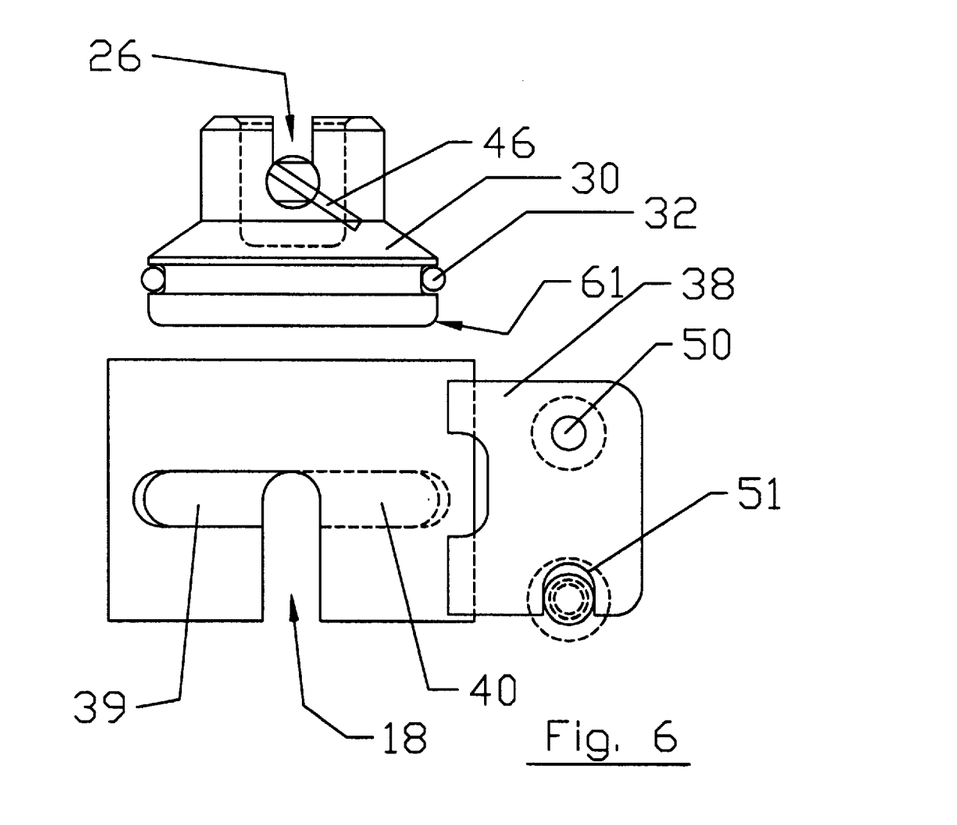
FIG. 6 is a lateral plan view of the cup receiving structure and plunger assembly of the ice cream extrusion assembly.

FIG. 4 shows an extrusion cup 15 placed within the cup receiving means 14. As shown, the extrusion cup 15 has opposing posts 35 and 36 extending therefrom and which are shown utilized to mount the extrusion cup 15 within the cylindrical sleeve of the cup receiving means 14. A handle 27 is shown attached to post 35 of the extrusion cup 15. The handle 27 permits the user to remove the extrusion cup 15 to fill the cup with a quantity of ice cream and to replace the extrusion cup 15 into the cup receiving means 14 for extrusion processing. The cup handle 27 is preferably constructed of a plastic material or the like and which is easily gripped, easily cleaned and constructed with a food grade material. As will be further discussed, a number of extrusion cups may be utilized in conjunction with the ice cream extrusion assembly 10 of the present invention. And although each extrusion cup may have the same exterior structural configuration, the extrusion apertures or single aperture in the bottom of the cups may have differing extrusion apertures, configurations and patterns.

Figures 7, 8:
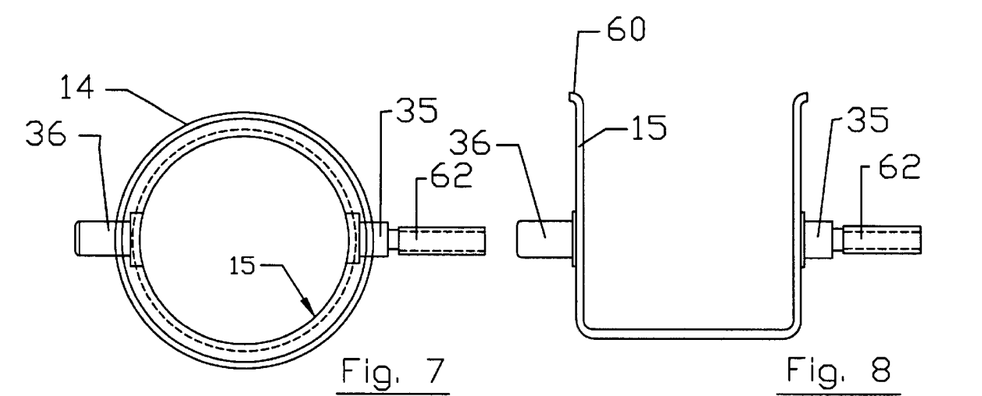
FIG. 7 is a top plan view showing the cup locked into the cup receiving structure.
FIG. 8 is a sectional view of the cup of the ice cream extrusion assembly.

FIGS. 4–8 show the cup receiving means 14 having a cylindrical sleeve and a pair of brackets 37 and 38. The cylindrical sleeve 14 is shown to have opposing slotted apertures 39 and 40 for receiving the opposing posts 35 and 36 of the extrusion cup 15. The pair of brackets 37 and 38 secure the cylindrical sleeve 14 to the upright portion of the housing assembly 11. FIG. 7 shows the extrusion cup 15 mounted within the cylindrical sleeve 14 of the cup receiving means and wherein the opposing posts 35 and 36 are positioned or locked into the horizontally disposed portions of the opposing slotted apertures 39 and 40 of the cylindrical sleeve 14.

Figure 9:
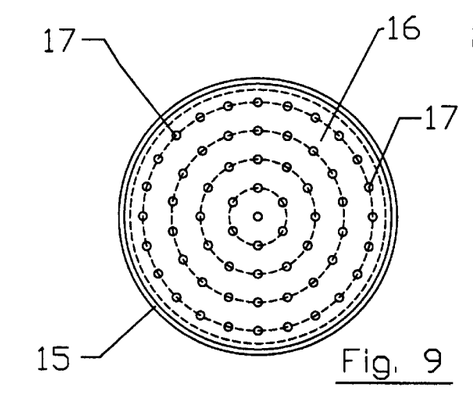
FIG. 9 is a bottom view of the cup showing the extrusion apertures therethrough.
Figure 10:
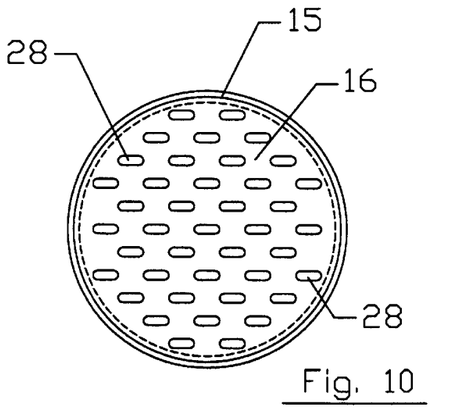
FIG. 10 is an alternate embodiment of the extrusion apertures in the bottom of the cup.

FIGS. 9 and 10 respectively show perforated bottoms of the extrusion cup 15. In FIG. 9 each extrusion aperture 17 has a circular cross-sectional configuration and the respective apertures 17 are shown aligned in concentric circular patterns, each aperture 17 being generally shaped a predetermined distance from each other in both the radial and peripheral direction. This extrusion pattern arrangement is utilized to extrude elongated strings of ice cream having the look and feel of spaghetti. In FIG. 10, each extrusion aperture has an oblong cross-sectional configuration 28 and the respective apertures are shown aligned in rows and further shown arranged wherein individual apertures 28 are positioned in alignment in every other row. The extrusion aperture arrangement of FIG. 10 is utilized to extrude an oblong cross-sectional string or ribbon of ice cream, or other foods, having the look and feel of fettuccini. It is within the purview of the invention to also provide extrusion cups having perforated bottoms comprised of extrusion apertures, having different cross-sectional configurations, i.e., elongated apertures or a single aperture to assimilate the formation of broad, flat strips of ice cream having the look and feel of lasagna. Other extrusion configurations or patterns are within the purview of the present invention.

The extrusion cups 15 utilized in the cylindrical sleeve 14 have a predetermined diameter which generally corresponds to the plunger head 30 with the rubber sealing ring 32 peripherally mounted in the groove. Further, as shown in FIG. 4, the extrusion cup 15 has a rounded flared interior upper edge 60 to guide the protrusion of the plunger head 30 into the cup 15. The sealing ring 32 contacts the interior side surface of the cup 15 so that all of the ice cream is extruded through the perforated bottom 16. The sealing ring 32 is an O-ring structure constructed of an elastomeric material and being of a food grade quality.

Figure 14:
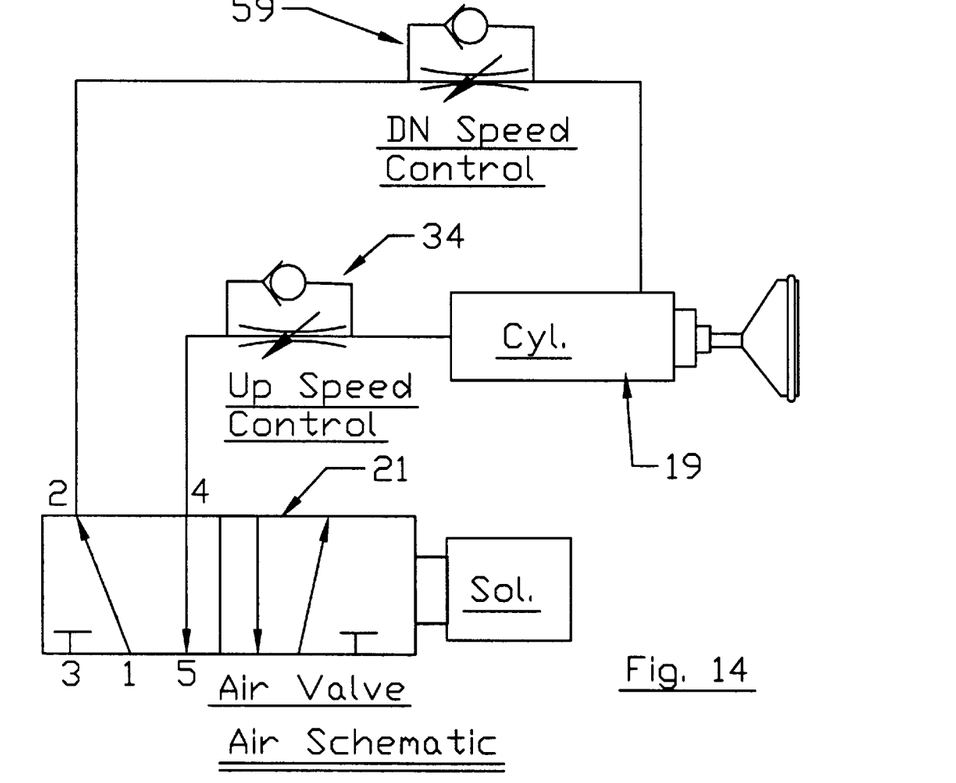
FIG. 14 is a schematic diagram showing the compressed air flow for the ice cream extrusion assembly.
Figure 15:
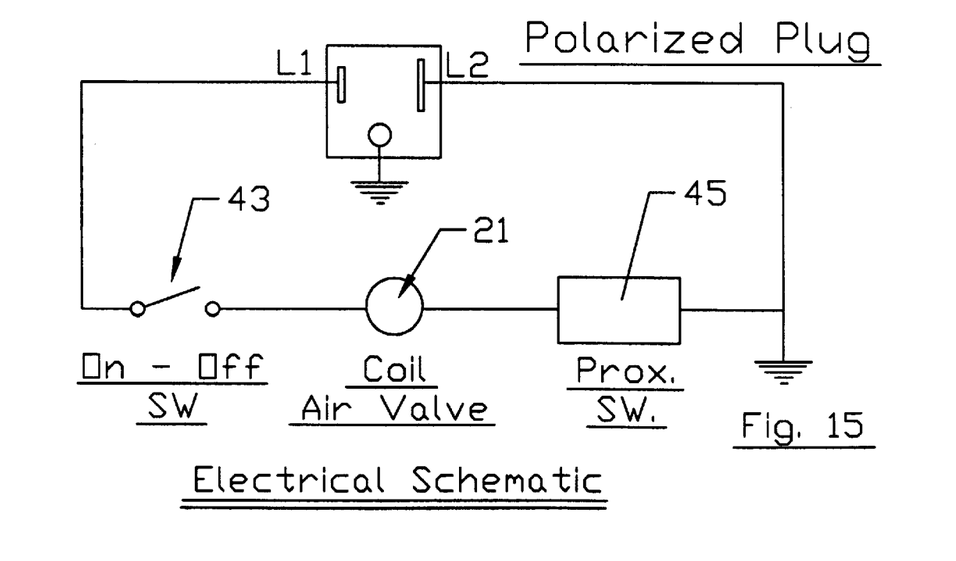
FIG. 15 is an electrical schematic diagram for the ice cream extrusion assembly.

Referring to FIGS. 1, 2, 14 and 15, the ice cream extrusion assembly is shown to have a plunger assembly 19 comprising of an air cylinder having a piston and plunger head 30 attached thereto. The air cylinder 19 is shown connected to a control valve 34 by means of air line 24. An electrical source and a compressed air source are shown provided to the housing 11 of the ice cream extrusion assembly 10. A compressed air source 20 is connected to air inlet 42 at the rear of the upright structure 55. A compressor producing 80–120 psi has been found suitable for use with extrusion assembly 10 and one such air compressor may be utilized for a plurality of extrusion assemblies. An electrical inlet 41 is also positioned at the rear of the upright structure 55. The electrical schematic of FIG. 15 shows the on/off switch 43, the coil of the air valve 21 and the proximity switch 45 which is positioned at the end of conduit 44 and adjacent the cylindrical sleeve 14 for activation by post 36 of the extrusion cup 15. As will be further described below, the proximity switch 45 is provided whereby its activation is necessary for the operation of the extrusion assembly 10. The switch 45 is preferably adjustably mounted with respect to the bottom of the conduit 44 and wherein the electrical cable extends from the switch 45 to the interior of the upright structure 55. Thus, the moveable member of the proximity switch 45 may be adjusted to accommodate any deviation of the positioning of the cylindrical sleeve 14 and/or the placement of the extrusion cup 15 therein.

The compressed air utilized in the extrusion assembly 10 is shown connecting the valve 21 from the inlet 42 by means of air line 22. The valve 21 is shown connected to valve 34 for controlling the upward movement of the piston of the air cylinder and to valve 59 for controlling the downward movement of the piston of the air cylinder 19. Respectively, air lines 23, 24, 25 and 58 connect the valve elements which are located within the upright structure 55 of the housing 11. As further shown, seals 54 are provided to seal the air lines 24 and 58. The control valves 34 and 59 which respectively control the up and down movement of the air cylinder's plunger assembly 12 are accessible from the outside of the upright structure 55. Thus, depending upon the consistency or hardness of the food to be extruded, the operator may turn respective adjustment knobs to control the airflow in the valves 34 and 59 and to, thereby, control the rate of movement of the plunger assembly 12.

In operation, the cup 15 is filled with a quantity of ice cream and grasped by the handle 27. The cup 15 is placed into the cylinder sleeve 14 whereby opposing posts 35 and 36 are aligned respectively with the slotted apertures 39 and 40 and locked into place. Post 36 engages contact switch 45 extending from the conduit 44 and which permits the valve 21 to operate the air cylinder 19 to thereby cause the plunger head 30 to enter the aligned cup 15 for extracting the ice cream through the perforated bottom 16. A serving dish or plate positioned on base 13 receives the strands of elongated ice cream strands. Subsequently, or, alternatively, during the extrusion process various toppings may be added to the ice cream for serving and consumption.

The air cylinder 19, piston rod extension 63 and plunger head 30 are constructed and arranged to provide a uniform downward force to the bottom of the extrusion cup 15. Upon reaching the bottom of the piston stroke, the valve 21 is reversed so that the compressed air is utilized to retract the plunger head 30 to its original position. The valve 21 has a function which permits the exhaust of compresses air in the air system when the direction of the air cylinder 19 is reversed. The control valves 34 and 59 may be adjusted to control the speed of the up and down movement of the plunger head 30 by controlling the air pressure on the air cylinder 19. For example, the temperature and texture of the ice cream being extruded through cup 15 may require adjustment of the control valve 59 for proper ice cream extrusion or the extrusion of other food products.

As many changes are possible to the embodiments of this invention utilizing the teachings thereof, the descriptions above, and the accompanying drawings should be interpreted in the illustrative and not the limited sense.

That which is claimed:

1. An ice cream extrusion assembly comprising:
    a) a housing assembly having a base member and an upright structure;
    b) a plunger assembly mounted to said housing assembly having a shaft and a separable plunger head and being constructed and arranged to provide a downward force toward said housing assembly base member;
    c) a container mounting structure extending from said housing assembly constructed and arranged to support an extrusion container in alignment with said plunger head of said plunger assembly;
    d) an extrusion container having a bottom with a predetermined pattern of extrusion apertures, each having a predetermined shape and means being constructed and arranged for separable attachment to said mounting structure and for receiving said plunger head of said plunger assembly; and
    e) activation means comprising power means for driving the plunger assembly and switch means for activating the power means, said power means in communication with said plunger assembly and said switch means mounted to said housing assembly and being for communication with the attachment of said extrusion container to said container mounting structure.

2. The ice cream extrusion assembly of claim 1, wherein said extrusion apertures are circular in configuration and are spaced to extrude a plurality of ice cream strands.

3. The ice cream extrusion assembly of claim 1, wherein said extrusion apertures have an oblong, cross-sectional configuration.

4. The ice cream extrusion assembly of claim 1, wherein said separable plunger head is a unitary structure having a circular cross-section and an indented circumferential surface with a sealing ring mounted therein.

5. The ice cream extrusion assembly of claim 1, wherein said container mounting structure comprises a cylindrical sleeve having opposing slots extending from the bottom thereof.

6. The ice cream extrusion assembly of claim 5, wherein said extrusion container has a cylindrical wall having opposing pegs extending outwardly therefrom, said opposing pegs being constructed and arranged to lockingly engage said opposing slots of said cylindrical sleeve.

7. The ice cream extrusion assembly of claim 6, wherein a handle member is attached to one said opposing peg of said extrusion container.

8. The ice cream extrusion assembly of claim 1, wherein said power means comprises a compressed air source and an activatable pneumatic cylinder connected to said plunger assembly shaft.

9. The ice cream extrusion assembly of claim 8, wherein said activation means includes a solenoid valve, an electric source and a plurality of compressed air lines.

10. The ice cream extrusion assembly of claim 1, wherein said housing assembly, said plunger assembly, said container mounting structure and said extrusion container are constructed of a stainless steel material.

11. A food extrusion assembly comprising:
    a) a housing structure having a base and an upstanding enclosure;
    b) a plunger assembly having a shaft and a head;
    c) a removable cup having a perforated bottom comprising a plurality of extrusion apertures of a predetermined configuration and pattern;
    d) a cup mounting and locking structure;
    e) power means for driving said plunger assembly; and
    f) switch means coupled to said cup locking structure to activate said plunger assembly.

12. The extrusion assembly of claim 11, wherein said cup mounting and locking structure comprises a sleeve axially aligned with the head of said plunger assembly and mounted to said housing structure.

13. The extrusion assembly of claim 12, wherein said sleeve has opposing slots extending therethrough and wherein said cup has opposing posts constructed and arranged to engage and lock into said opposing slots of said sleeve.

14. The extrusion assembly of claim 13, wherein said cup has a handle member mounted to one said post.

15. The extrusion assembly of claim 11, wherein said perforated bottom has extrusion apertures in a concentric arrangement, each extrusion aperture being circular in configuration.

16. The extrusion assembly of claim 11, wherein said perforated bottom has extrusion apertures in an oblong configuration.

17. The extrusion assembly of claim 11, wherein said power means comprises an air cylinder and a compressed air source.

18. The extrusion assembly of claim 11, wherein said housing structure has an exterior covering constructed of stainless steel and further wherein said shaft and head of said plunger assembly, said removable cup and said cup mounting and locking assembly are constructed of stainless steel.

19. The extrusion assembly of claim 11, wherein said head of said plunger assembly has a seal member mounted circumferentially thereabout.

20. A food extrusion assembly comprising:
    a) a housing assembly having a base member and an upright structure;
    b) a plunger assembly mounted to said housing assembly having a shaft and a separable plunger head and being constructed and arranged to provide a downward force toward said housing assembly base member;
    c) a container mounting structure extending from said housing assembly constructed and arranged to support an extrusion container in alignment with said plunger head of said plunger assembly;
    d) an extrusion container having a bottom with at least one extrusion aperture, said extrusion container being constructed and arranged for placement in said mounting structure and for receiving said plunger head of said plunger assembly; and
    e) activation means comprising power means for driving the plunger assembly, and switch means for activating the power means, said power means being in communication with said plunger assembly and said switch means mounted to said housing assembly and being for communication with said extrusion container.

* * * * *